(12) United States Patent
Pauley et al.

(10) Patent No.: US 11,199,638 B2
(45) Date of Patent: Dec. 14, 2021

(54) INPUT COUNT RATE ESTIMATION IN RADIATION PULSE DETECTORS

(71) Applicant: Southern Innovation International Pty Ltd, Carlton North (AU)

(72) Inventors: Michael Pauley, Murdoch (AU); Paul Andrew Basil Scoullar, Fitzroy North (AU); Christopher Charles McLean, Kangaroo Flat (AU); Andi Chow, Cherrybrook (AU); Nir Drabkin, Oakleigh South (AU)

(73) Assignee: Southern Innovation International Pty Ltd, Carlton North (AU)

( * ) Notice: Subject to any disclaimer, the term of this patent is extended or adjusted under 35 U.S.C. 154(b) by 0 days.

(21) Appl. No.: 17/049,921

(22) PCT Filed: Apr. 25, 2019

(86) PCT No.: PCT/AU2019/050366
§ 371 (c)(1),
(2) Date: Oct. 22, 2020

(87) PCT Pub. No.: WO2019/204872
PCT Pub. Date: Oct. 31, 2019

(65) Prior Publication Data
US 2021/0239866 A1 Aug. 5, 2021

(30) Foreign Application Priority Data

Apr. 27, 2018 (AU) .................. 2018202912

(51) Int. Cl.
*G01T 7/00* (2006.01)
*G01T 1/17* (2006.01)

(52) U.S. Cl.
CPC .............. *G01T 7/005* (2013.01); *G01T 1/171* (2013.01)

(58) Field of Classification Search
CPC ............ G01T 7/005; G01T 1/171; G01T 1/17
See application file for complete search history.

(56) References Cited

U.S. PATENT DOCUMENTS

| 3,732,422 A | 5/1973 | Brunson et al. |
| 3,814,937 A | 6/1974 | Lowes |

(Continued)

FOREIGN PATENT DOCUMENTS

| EP | 0 410 828 A2 | 1/1991 |
| WO | WO 2009/121131 A1 | 10/2009 |

(Continued)

OTHER PUBLICATIONS

International Search Report received in PCT/AU2019/050366 dated Jul. 24, 2019.

*Primary Examiner* — David P Porta
*Assistant Examiner* — Meenakshi S Sahu
(74) *Attorney, Agent, or Firm* — Knobbe, Martens, Olson & Bear, LLP (57) ABSTRACT

The invention provides a method of estimating an input count rate of a radiation pulse detector from a detector signal where some individual signal pulses making up the detector signal are closely spaced in time less than a minimum reliable detection gap. In one aspect, the individual signal pulses are detected using a detection algorithm and a plurality of interval start times are defined each interposed with at least one of the detected individual signal pulse arrival times, each interval start time being later by at least the minimum reliable detection gap than a corresponding most recent detected individual signal pulse arrival time. A corresponding plurality of individual signal pulse arrival intervals are calculated between each of the interval start times and a corresponding next detected individual signal pulse arrival time.

16 Claims, 3 Drawing Sheets

(56) References Cited

U.S. PATENT DOCUMENTS

| | | | |
|---|---|---|---|
| 4,198,986 A | 4/1980 | Suzuki | |
| 4,922,442 A | 5/1990 | Bolk et al. | |
| 6,008,493 A | 12/1999 | Shao et al. | |
| 7,728,307 B2 * | 6/2010 | Barat | G01T 1/2928 250/395 |
| 2005/0123090 A1 | 6/2005 | Heismann et al. | |
| 2012/0239310 A1 | 9/2012 | Ouvrier-Buffet et al. | |
| 2014/0191136 A1 | 7/2014 | Loeliger et al. | |
| 2017/0248704 A1 | 8/2017 | Nelson et al. | |

FOREIGN PATENT DOCUMENTS

| | | |
|---|---|---|
| WO | WO 2015/085372 A1 | 6/2015 |
| WO | WO 2017/211880 A1 | 12/2017 |

* cited by examiner

INPUT COUNT RATE ESTIMATION IN RADIATION PULSE DETECTORS

CROSS-REFERENCE TO RELATED APPLICATIONS

This application is a national phase of PCT Application No. PCT/AU2019/050366, filed on Apr. 25, 2019, which claims priority to Australian Patent Application No. 2018202912 filed on Apr. 27, 2018, each of which is hereby incorporated by reference in its entirety.

FIELD

The present invention relates to the estimation of input count rate in radiation pulse detectors. The invention may be applied to detectors designed to detect pulses of radiative energy ("radiation pulses") of any kind and of any energies, including particle detectors designed to detect quantum mechanical particles such as photons, subatomic particles, ions, atoms, or detectors designed to detect classical radiation pulses such as seismic waves SONAR, SODAR, ultrasound or other material vibrations, or classical radar or light pulses, including LiDAR.

Applications in which radiation pulse detectors would benefit from the invention include but are not limited to security scanning, baggage scanning, medical imaging, materials analysis, meteorological sensing, minerals processing, minerals analysis, reflection seismology, and DNA sequencing. Previous patent applications of the current applicant described various applications of radiation pulse detectors applicable to the current invention as described in more detail in published international patent applications PCT/AU2005/001423, PCT/AU2009/000395, PCT/AU2009/001648, PCT/AU2012/000678, PCT/AU2014/050420, PCT/AU2017/050514 and PCT/AU2017/050512 the contents of each of which is hereby incorporated by reference in its entirety, as examples of applications and apparatuses in which embodiments of the left of the current invention may be implemented in appropriate software. The current invention therefore extends to such apparatuses appropriately programmed with the method of the current invention and the applications of those apparatuses described in the above-mentioned international patent applications.

BACKGROUND

In radiation pulse detectors, individual pulses of radiation enter the detectors and generate individual signal pulses. Typically for particle detectors the individual signal pulses are an electrical signal resulting from a cascade of photons responding to the impinging radiation particle on the detector material. Depending on the intensity of the radiation, the number of radiation pulses entering the detectors and interacting with the detector material per unit time varies. This parameter is called the input count rate, and is important to measure for reasons depending on the application. By contrast, the output count rate is the number of radiation pulses actually detected by the detection circuitry, which in general is less than the input count rate for various reasons discussed below. Estimating the input count rate enables a reliable representation of the intensity of radiation, which is important in accurate quantitative radiation detection. For example, in radiation imaging, each pixel is represented by an intensity being the incident flux of individual radiation pulses (such as quantum particles). In a materials characterisation device, the input count rate is needed to normalise a concentration of a mineral or other component identified by characteristics of the radiation measured. In an X-ray diffraction application, an accurate measure of intensity of the diffraction rings is important in characterising the structure of the material being examined.

In radiation particle detectors, the individual signal pulses may pass through electronic pre-processing, such as to convert a ramp signal into a pulse signal, and as such may involve analogue and digital stages or components.

Because each individual signal pulse has a finite duration, and the time of arrival of each individual signal pulse is random and independent, it is common that more than one individual signal pulse can arrive at the detector within that finite duration, resulting in "pulse pileup" whereby the signal is caused by a superposition of two or more closely arriving individual signal pulses. At very high radiation fluxes or in detectors with long individual signal pulse durations, it may be that the aggregate detector signal is continuously above a baseline level.

Pulse pileup itself does not prevent the discrimination of all multiple overlapping pulses and therefore detection of many multiple individual signal pulse arrivals in a piled up signal is still possible. Many signal processing techniques exist to reliably count some or many individual signal pulses within a piled up signal. Simple techniques may involve temporal differentiation to detect each individual signal pulse arrival by detecting a rapid increase in signal above a threshold to define the start of each pulse. More complex techniques are required if the energy of each pulse is required to be resolved. For example, the current applicant has invented several such techniques, most of which rely a measured or assumed pulse shape of each individual pulse and a mathematical technique to disentangle the individual pulses and assign arrival time and energy (amplitude) to each individual pulse.

Individual signal pulse identification techniques of the current applicant are described in more detail in published international patent applications PCT/AU2005/001423, PCT/AU2009/000395, PCT/AU2009/001648, PCT/AU2012/000678, PCT/AU2014/050420, incorporated by reference above.

Despite the fact that it is possible to disentangle many individual signal pulses in a piled up signal, even with sophisticated algorithms it is nonetheless inevitably the case that individual signal pulses occasionally arrive effectively simultaneously, so that the pulse shape formed by the sum of an individual signal pulse from an individual signal pulse individual signal pulse of energy $E_1$ and an individual signal pulse from a particle of energy $E_2$ is indistinguishable from an individual signal pulse from a single individual signal pulse of approximately energy $E_1+E_2$.

Furthermore, the physics of particle detection in some particle detectors may more generally involve a period of no or reduced sensitivity after each detection event whereby a subsequent particle arrival arriving within the period of no or reduced sensitivity is unable or less able to produce the expected individual signal pulse.

At high count rates, as the mean interval between counts reduces the number of undetected individual signal pulse arrivals increases, making the number of detected individual signal pulse arrivals arriving per second an increasingly poor under-estimate of the actual input count rate.

The inverse of the input count rate is the mean time between individual signal pulse arrivals $\mu$, which is overestimated by the mean time between detected individual signal pulse arrivals.

Figure 1:
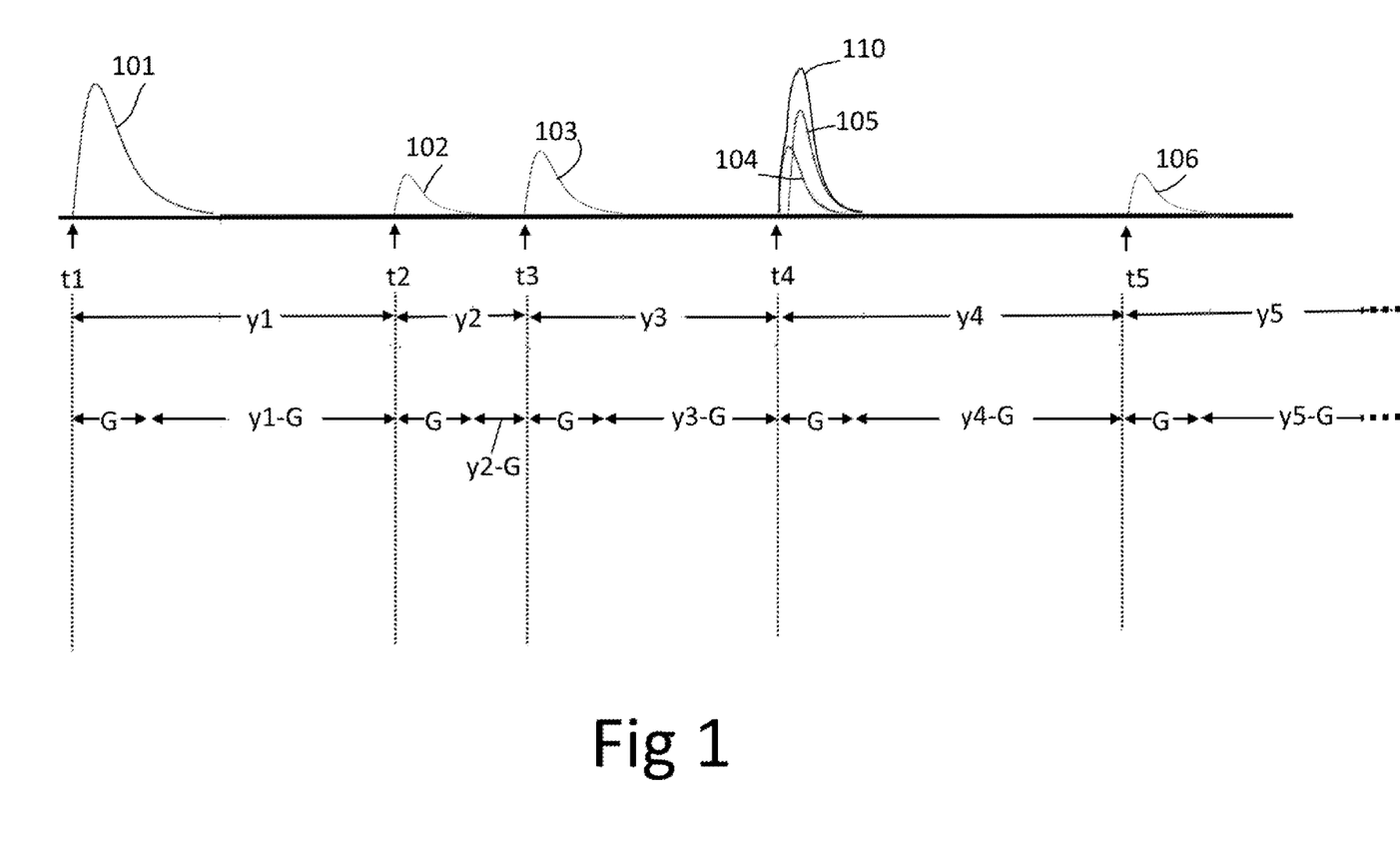
FIG. 1 is an example detector signal waveform, illustrating the operation of the invention according to an embodiment.

Referring to FIG. 1, six individual signal pulses 101-106 are shown arriving at different times. Pulses 104 and 105 are closely spaced and overlapping to form a piled up signal 110 and are in this example assumed to be too closely spaced to be detected as separate individual signal pulse arrivals. The detected arrival times are therefore $t_1$, $t_2$, $t_3$, $t_4$, $t_5$.

Consider that the total number of detected individual signal pulse arrivals in a measurement period T is N, with arrival times $t_1 \ldots t_N$, with $T=t_N-t_1$. The mean time between detected individual signal pulse arrivals is then $\Sigma n\ y_n/N$ where $y_n=t_n-t_{n-1}$ is the interval between adjacent arrivals, and evaluates to T/N. This is an overestimate of $\mu$ and an underestimate of the input count rate $1/\mu$, because the total number of detected individual signal pulse arrivals N underestimates the total actual number of individual signal pulse arrivals $N_p$, and $\mu=T/N_p$.

A conventional approach to this problem, which is sometimes called the "dead time correction problem", is to estimate a parameter called the "dead time" $T_{dead}$ which corresponds to a fixed time period after the detection of each pulse which the detector is supposed to be completely unable to detect or discriminate another pulse, and to effectively stop the clock for the amount of the dead time after each detected pulse. This adjusts the time period T downwards by the dead time multiplied by the number of pulses detected, to a corrected time period $T_{corr}$. A problem with this approach is that the concept of a dead time is simplistic, and prior attempts to improve the approach have focused on increased sophistication of the dead time concept in better modelling the dead time, improving the downwards adjustment of the time period in the formula $\mu=T_{corr}/N$.

It is an object of the current invention to provide an improved method of input count rate estimation by an alternative approach. The current inventors have developed a method that avoids the need for better modelling of "dead time", by focusing instead on a method which allows not all of the N detected counts to be used in the computation of input count rate.

U.S. Pat. No. 7,728,307 by Barat—column 8, lines 13-29 discloses a method of estimating the input count rate by focusing only on a time period during which the detector signal is at baseline, between clusters of individual signal pulses, a cluster being defined as a contiguous period where the detector signal is above baseline. Barat's method is performed as a preliminary step before attempting to utilise a pulse discrimination algorithm to detect the potentially multiple individual signal pulse arrivals within each cluster. Barat states that the time period between the end of one cluster of individual signal pulses and the beginning of the next, during which the signal is at or below baseline, is a Poisson process enabling computation of input count rate as the mean of all intervals between clusters. However, this method cannot be used at high count rates when the pulses are always piled up since the signal never reduces to baseline. In addition, at medium count rates, where the detector signal periodically falls to the baseline but there are many individual signal pulse arrivals within each cluster, most received counts will be unnecessarily rejected, and the sensitivity of the detector insofar as it measures the input count rate is severely compromised, necessitating an extended counting time, which is not desirable and may not be available in an environment of dynamically changing flux.

The current invention enables unbiased measurement of count rate without detailed modelling of a dead time while maintaining high detector sensitivity.

SUMMARY OF THE INVENTION

Each radiation pulse arrival is a random event independent of all other radiation pulse arrivals, with a constant probability of arrival per unit time, irrespective of previous history of arrivals. This gives rise to a Poisson distribution of mean $\mu$ for the interval from any arbitrary time to the next arrival, not just from one arrival to the next arrival as in the current methods of count rate estimation as described above, or from the end of each cluster of individual signal pulses at baseline to the start of the next as in the Barat reference above.

The invention works by exploiting the arbitrariness of the start time to selectively include only reliable intervals from a set of detected individual pulse arrival times. Rather than using each detected individual signal pulses arrival $t_{n-1}$ as the start time of the naïve method or the end of each cluster as the start time of Barat's method, we can choose any start time, denoted $s_k$. The computed intervals using such start times will be unbiased so long as each chosen start time $s_k$ is at least a minimum reliable detection gap after the most recent individual signal pulse arrival. The minimum reliable detection gap can be determined if desired by methods disclosed herein. With start times $s_k$ chosen in this way, when the next individual signal pulse arrival after $s_k$ is detected at $t_k$ we can be always sure that this is the first individual signal pulse arrival since the start time $s_k$, and there are no undetected arrivals in the interval. We then repeat the process and choose a next start time $s_{k+1}$ after $t_k$ which is at least the minimum detection interval after any previous detected individual signal pulse arrival, and record $t_{k+1}-s_{k+1}$. The mean of the set of acquired values $t_k-s_k$ is thus an unbiased estimator of $\mu$, because there are no undetected arrivals within those intervals, and therefore its inverse is an unbiased estimator of the input count rate $1/\mu$. Thus, start times and detected individual signal pulse arrivals are selectively chosen for inclusion in calculation of the mean interval which are reliably intervals representing a time until the next actual individual signal pulse arrival, and do not contain hidden additional individual signal pulse arrivals.

In accordance with a first broad aspect of the invention there is provided a method of measuring an input count rate of a radiation pulse detector, the method comprising the steps of:

(1) receiving radiation pulses from a radiation source at a detector;
(2) receiving a detector signal from the detector comprising an aggregation of individual signal pulses from each received radiation pulse;
(3) detecting individual signal pulses in the detector signal and determining corresponding detected individual signal pulse arrival times, some of which are separated by less than a minimum reliable detection gap;
(4) defining a plurality of interval start times each neighbouring pair of which being interposed with at least one of the detected individual signal pulse arrival times, each interval start time occurring later by at least the minimum reliable detection gap than a corresponding most recent detected individual signal pulse arrival time;
(5) calculating a corresponding plurality of individual signal pulse arrival intervals between each of the interval start times and a corresponding next detected individual signal pulse arrival time;
(6) computing an input count rate parameter, based on the individual signal pulse arrival intervals;

wherein the minimum reliable detection gap is a minimum period that excludes undetected individual signal pulse arrivals from occurring within each individual signal pulse arrival interval.

In accordance with a second broad aspect of the invention there is provided a method of measuring an input count rate of a radiation pulse detector, the method comprising the steps of:

(1) receiving radiation pulses from a radiation source at a detector;
(2) receiving a detector signal from the detector comprising an aggregation of individual signal pulses from each received radiation pulse;
(3) detecting individual signal pulses in the detector signal and determining corresponding detected individual signal pulse arrival times, some of which are separated by less than a minimum reliable detection gap; and
(4) computing an input count rate parameter, based on only selected intervals between neighbouring detected individual signal pulse arrival times which are greater than a specified detection gap, and to the extent they are greater than the specified detection gap, the specified detection gap being greater than the minimum reliable detection gap;

wherein the minimum reliable detection gap is a minimum period that excludes undetected individual signal pulse arrivals from occurring within each individual signal pulse arrival interval.

In accordance with a third broad aspect of the invention there is provided a method of estimating an input count rate of a radiation pulse detector, the method comprising the steps of:

(1) receiving radiation pulses from a radiation source at a detector over a calibration period, the received radiation pulses per unit time defining the input count rate during the calibration period;
(2) measuring a detector signal over the calibration period from the detector comprising an aggregation of individual signal pulses from each received radiation pulse; and (A) in a calibration mode:
(3) calculating a parameter derived from the detector signal sampled over the calibration period, the parameter being a known function of the input count rate;
(4) estimating a calibration input count rate during the calibration period using a chosen input count rate estimation method applied to the detector signal sampled over the calibration period known to be reliable at the estimated calibration input count rate; and
(5) determining a calibration function relating measurements of the parameter to the input count rate based on the calculated parameter over the calibration period, the calibration input count rate during the calibration period and the known function; and (B) in an operation mode:
(6) calculating the parameter derived from the detector signal over a measurement period;
(7) estimating the input count rate during the measurement period by applying the calibration function to the parameter derived from the detector signal over the measurement period.

In one embodiment, the known function of the input count rate is proportionality and the calibration function and the step of determining the calibration function comprises determining a proportionality constant. The parameter may be based on an average sample value of the detector signal over the calibration or measurement period.

In one embodiment, the chosen input count rate estimation method is one of the methods of any one of claims 1 to 16.

Features of further embodiments and aspects of the invention can be ascertained from the description and accompanying claims.

DETAILED DESCRIPTION OF EMBODIMENTS

Embodiments of the current invention will now be described.

The steps of detecting individual signal pulses in the detector signal and determining detected individual signal pulse arrival times (and optionally determining corresponding detected individual signal pulse energies) referred to in the first and second aspects above may be performed by any pulse detection algorithm known in the art, including those of the applicant referred to above and future such methods, and need no further elucidation here. In what follows below, it is assumed that a stream of detected individual signal pulse arrival times $t_k$ is available from such a pulse detection algorithm.

Referring first to FIG. 1, an embodiment of the invention utilises a choice of the start time $s_k$ which is a gap G after the most recent detected individual signal pulse arrival at $t_{k-1}$. Gap G is chosen as a constant value close to but greater than the minimum reliable detection gap. Choosing all such available start times $s_k$ maximises the available reliable count data for determination of the input count rate, which may be expressed in terms of the average interval μ as $$\mu = \sum_{k:y_k>G} \frac{y_k - G}{N_G} \qquad \text{(Equation 1)}$$

where $N_G$ is the number of samples satisfying the criterion $y_k>G$. This quantity effectively takes the average of all intervals between adjacent detected individual signal pulse arrivals $y_k$ which are greater than G, and to the extent they are greater than G (i.e $y_k-G$). In FIG. 1, it can be seen that all five detected individual signal pulse arrival times are used in the sequence.

Equation 1 above is strictly valid only for continuous quantities for which the discontinuous effect of the digital sampling interval is insignificant, which occurs if the gap G is a large multiple of the digital time sampling interval Δ, or if the recorded arrival times $t_k$ are computed with sub-sample accuracy, the former or latter case applying depending on the particular pulse identification algorithm discussed above and known in the prior art. Where the discontinuous effect of the digital sampling interval is significant, a correction must be applied, which is readily determined. For example, if the recorded arrival times $t_k$ are calculated only to the nearest digital time sampling point, then heuristic reasoning informs that the criterion $y_k>G$ in reality is $y_k>G-\frac{1}{2}\Delta$ due to rounding error, and so the following corrected formula applies:

$$\mu = \sum_{k:y_k>G} \frac{y_k - G + \frac{1}{2}\Delta}{N_G} \qquad \text{(Equation 2)}$$

The heuristic argument may be verified by formal derivation.

Figure 2:
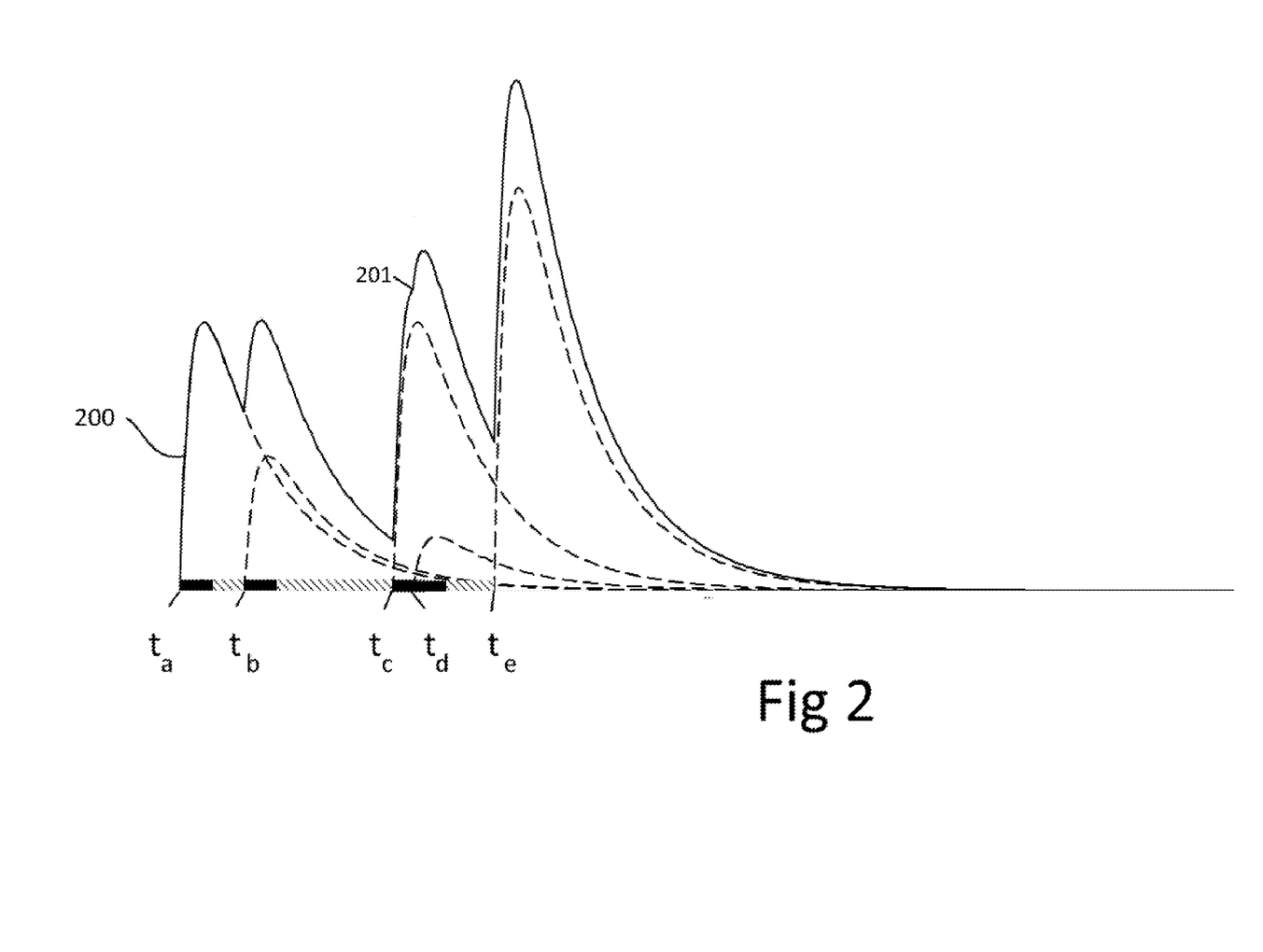
FIG. 2 is another example detector signal waveform of a number of pulses subject to pulse pileup.

FIG. 2 is an example with individual signal pulse arrivals all piled up together and in which the signal 200 is not returning to baseline. This is considered in two scenarios in which the individual signal pulse arrival at $t_d$ is or is not detected, since it is only evidenced by the slightly misshapen peak at 201 and depending on the sophistication of the arrival detection algorithm may or may not be detected. We also assume G is just larger than $t_d$-$t_c$. The first two terms in the sum will be according to the above algorithm $t_b$-$t_a$-G and $t_c$-$t_b$-G. If the individual signal pulse arrival at $t_d$ is detected, then the next term in the sum will be $t_e$-$t_d$-G. These terms in the sum are represented in FIG. 2 as hatched sections along the axis, and the time periods which are correspondingly excluded are illustrated with blocked sections of duration G after each detected individual signal pulse arrival. If the individual signal pulse arrival at $t_d$ is not detected, then the next term in the sum will be $t_e$-$t_c$-G.

In the above example there are instances in which some detected individual signal pulse arrival times do not appear in the sum because they occur within G of the next detected individual signal pulse arrival. This is the principle of operation of the invention: to exclude unreliable intervals which may hide an undetected individual signal pulse. While in principle there is no upper limit on G, the larger the value, the more of the detected individual signal pulse arrivals are rejected and the longer it takes to accumulate sufficient samples for an accurate assessment of the mean arrival interval, the standard error of which is inversely proportional to the square root of the number of samples. Thus, higher than necessary values of G effectively reduce the sensitivity of the detector.

Rejection of certain detected individual signal pulse arrival times in the computation is an important advantage of the invention which enables robust performance compared with prior art methods which attempt to compute an accurate dead time and make use of all available detected individual signal pulse arrivals.

Figure 3:
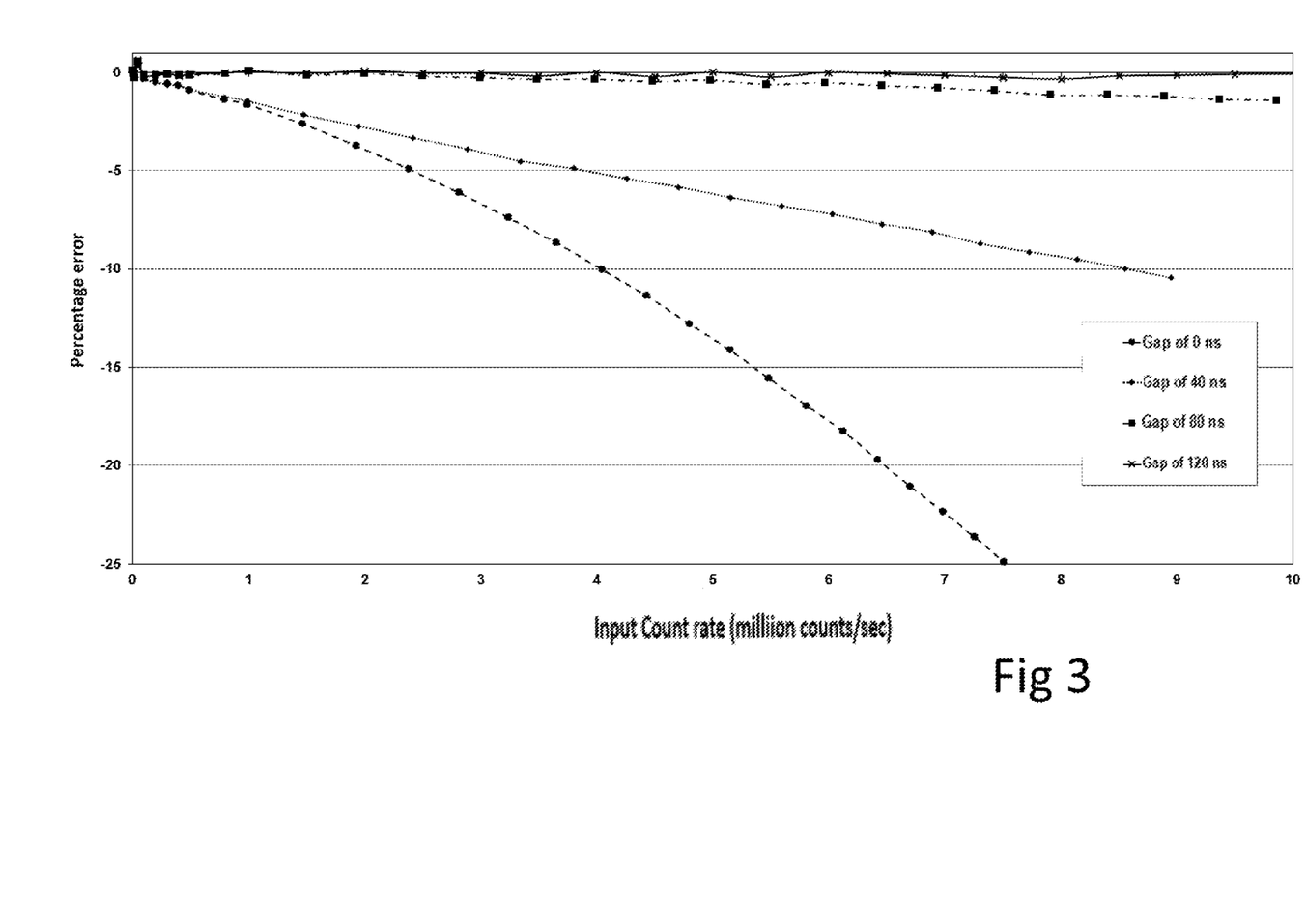
FIG. 3 is a digital simulation showing performance of an embodiment of the invention.

Digital simulations of signals can be used to verify implementations of the invention, and to provide a mechanism to determine an optimum value of G. FIG. 3 shows results from a digital simulation of a detector signal formed from individual pulses of radiation typical of a silicon drift diode (SDD) detector at different simulated actual input count rates up to 10 million counts per second. At each simulated actual input count rate, the input count rate estimation algorithm was performed with different values of the gap parameter G. The individual signal pulse detection algorithm used was the method disclosed in PCT/AU2014/050420. A zero value of G represents the naïve computation, showing as expected that the estimated input count rate becomes increasingly an underestimate as the actual count rate goes up and the percentage of undetected individual signal pulse arrivals increases. As the value of G increases, the percentage error reduces until at a value of 120 ns, the error is essentially zero at all actual count rates up to 10 million counts per second. The analogue to digital sampling rate in the simulation was 250 MHz, therefore a value of G of 120 ns represents 30 samples. Higher values of G (not shown) also show essentially zero error rate, with and increasing time required for statistical accuracy as expected as more detected arrivals are rejected.

Simulation can thus be used to inform whether a particular specified detection gap is sufficient, and by varying the specified detection gap, determining an estimate of the minimum reliable detection gap. In this example, 120 ns is therefore an estimate of the minimum reliable detection gap.

Simulation of a particular implementation of the methods according to the invention can also therefore be used to verify that the implementation produces an unbiased estimate of the input count rate, without necessarily determining what is the minimum reliable detection gap. This is performed by simply simulating a method over the desired range of input count rates and verifying that the error of the estimated count rates stays within desired limits.

Real data can also be used to provide a mechanism for determining an appropriate value of G. One technique is to process a collection of datasets, all with the same spectrum but different count rates. Such a collection of datasets can be formed by using the same radiation source and measuring the detector signal with the source at different distances from the detector, thereby varying the actual count rate. If x(t) is the detector signal value at each time sample point t, then the average sample value $1/T\Sigma_{t=1}^{T} x(t)$ for T samples has an expectation value which scales linearly with actual input count rate. Checking that the computed input count rate according to the algorithm of the invention has a constant ratio with the average sample value for each dataset provides a confirmation that the value of G used in the algorithm is providing an unbiased estimator of input count rate over the range of count rates in the datasets. A non-constant ratio suggests that the value of G is too low. Similarly, the real data can be used on any particular implementation of the methods according to the invention, whether or not a fixed gap G is used.

It will be appreciated that the method remains unbiased as long as each start time $s_k$ is at least the minimum reliable detection gap, there is considerable freedom in the precise algorithm by which each start time $s_k$ is chosen. For example, in the example above a constant gap G is left after the most recent detected individual signal pulse arrival but the gap could also be randomly varied at each sample, as long as it remained above the minimum reliable detection gap, or could also include additional values dependent upon other parameters. For example, with individual signal pulse detection algorithms that identify both the start time of the pulse and a width of the pulse, the width of the most recent pulse could be added to the gap. Therefore, the term "specified detection gap" in the claims is intended to be broad enough to encompass specified detection gaps which are not necessarily constant but vary randomly or according to a formula of other parameters, unless the contrary intention is apparent.

Further, there is considerable freedom in the definition of the detected individual signal pulse arrival time. As long as the individual signal pulse arrival time relates to somewhere on the pulse, not necessarily the start of the rise time as shown in the diagrams, the algorithm can operate successfully, as the minimum reliable detection gap is simply adjusted upwards to compensate for any difference. It may be that even inconsistent positions on the pulse from sample to sample are robustly handled by the algorithm, which is readily verified according to the techniques described above.

It will also be appreciated that in some implementations of the invention, direct knowledge of the minimum reliable detection gap is not required, as it is only necessary that the detection gap is always sufficient to provide an unbiased estimate of input count rate in order to be sure that the detection gap is greater than the minimum reliable detection gap. In embodiments of the invention, a particular specified detection gap may be chosen and again it is sufficient to verify that the specified detection gap provides an unbiased estimate of the input count rate in order to be sure that the specified detection gap is greater than the minimum reliable detection gap. Direct knowledge of the minimum reliable detection gap is useful to optimise the detector sensitivity and the maximum use of detected individual signal pulse arrival times, in embodiments of the invention.

The above-described real data method of determining appropriate value of G may also be used as another method of estimating input count rate in an embodiment of the third broad aspect of the invention. In a simple embodiment, in an operation mode at each input count rate estimation time $t_e$ the average sample value $$X_e = \frac{1}{T} \sum_{t=t_e}^{T+t_e} x(t)$$

may be multiplied by a calibration constant C. The calibration constant C is determined in a calibration mode by performing a chosen input count rate determination method on a detector signal over a calibration time period $t_c$ to $t_c+T$ to produce a calibration count rate $R_c$, and over the same calibration time period calculating the average sample value $$\frac{1}{T} \sum_{t=t_c}^{t_c+T} x(t)$$

to produce a calibration average sample value $X_c$. The calibration constant is then the ratio $R_c/X_c$. During the calibration time period, the radiation source or detector position is adjusted if necessary so that the measured count rate is in a reliable region (typically a sufficiently low measured count rate) of the chosen input count rate estimation method. The chosen input count rate estimation method for the calibration may be the methods described herein in the first and second broad aspects, in which case the reliable region is wide, or a prior art method, in which case the reliable region is less broad. This average value sample method may be used where lower computational load is desired, and the gap-based method described herein can be used only for occasional calibration. The method described above can be generalised to any parameter derived from the detector signal which is a known function of the input count rate. New parameters and functions may be discovered with the assistance of verified unbiased estimator methods described herein and in the first and second broad aspects.

By the methods of the invention, a more accurate radiation pulse detector and detection method is provided. It will also be appreciated that the methods of the invention can be readily applied using software implementing the methods in a standard computer processor or digital signal processor hardware. Such hardware is already well known and typically present in radiation pulse detector systems.

Persons skilled in the art will also appreciate that many other variations may be made to the invention without departing from the scope of the invention, which is determined from the broadest scope and claims.

For example, while the detector signal is a digital signal sampled at a constant sample rate in the above example, the detector signal as defined in the claims extends in general to any time profile detector signal including an analogue signal.

For example, the invention extends to computation of any parameter related to the input count rate or from which the input count rate can be deduced, including of its reciprocal, the mean individual signal pulse arrival interval µ or any function thereof. The term "input count rate parameter" in the claims is intended to extend to such variations.

It will be understood that the number of pulse arrival intervals $N_G$ used in the computation of the input count rate estimation is variable depending on the accuracy required, which can be easily predicted by the standard error of the mean for the Poisson distribution of the mean individual signal pulse arrival interval µ divided by $\sqrt{N_G}$.

Further, while the illustrations all relate to circumstances of pulse pileup where the signal was above baseline and the pulse pileup is the cause of some detected individual signal arrival times being separated by less than the minimum reliable detection gap, the invention extends to foreseeable circumstances in which such unreliable intervals exist for reasons independent of whether or not pulse pileup occurs or is the cause.

Further also, while the equations provided herein compute the arithmetical mean of a set of numbers to derive µ, computation of other statistical parameters are within the broadest scope which are equal to or fixed functions of the arithmetical mean of the Poisson distribution and therefore enable its deduction, such as the median, mode, variance, skewness, kurtosis or entropy.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. Further, any method steps recited in the claims are not necessarily intended to be performed temporally in the sequence written, or to be performed without pause once started, unless the context requires it.

Corrections of the type provided by equation 2 in the case of digital sampling effects are intended to be within the scope of the claims which follow.

It is to be understood that, if any prior art publication is referred to herein, such reference does not constitute an admission that the publication forms a part of the common general knowledge in the art, in Australia or any other country.

The invention claimed is:

1. A method of measuring an input count rate of a radiation pulse detector, the method comprising the steps of:
receiving radiation pulses from a radiation source at a detector, the received radiation pulses per unit time defining the input count rate;
receiving a detector signal from the detector comprising an aggregation of individual signal pulses from each received radiation pulse;

using a detection method, detecting individual signal pulses in the detector signal and determining corresponding detected individual signal pulse arrival times;

defining a plurality of interval start times each neighbouring pair of which being interposed with at least one of the detected individual signal pulse arrival times, each interval start time occurring later than a corresponding most recent detected individual signal pulse arrival time by a specified detection gap being at least as large as a minimum reliable detection gap of the detection method, thereby ensuring that there are no undetected individual signal pulses occurring between each of the interval start times and a corresponding next detected individual signal pulse arrival time;

calculating a corresponding plurality of individual signal pulse arrival intervals between each of the interval start times and the corresponding next detected individual signal pulse arrival time; and computing an input count rate parameter, based on the individual signal pulse arrival intervals.

2. The method of claim 1, further comprising, in a verification phase, the steps of:

simulating detector signals of different known input count rates based on a known individual pulse shape for the detector;

performing the steps of detecting through to computing on the simulated detector signals; and confirming that the input count rate parameter produces an unbiased estimate of each of the different known input count rates.

3. The method of claim 1, further comprising, in a verification phase, the steps of:

processing a collection of datasets of real detection signals all with the same spectrum but different count rates, each having a derived parameter computed therefrom that is known to scale with input count rate;

performing the steps of detecting through to computing on each dataset; and confirming that the computed input count rate parameter scales corresponding to the derived parameter.

4. The method of claim 3, wherein the derived parameter computed from each data set is an average detector signal value of each data set.

5. The method of claim 1, wherein the specified detection gap is the minimum reliable detection gap.

6. The method of claim 1, wherein the specified detection gap is a constant value G.

7. A method of estimating an input count rate of a radiation pulse detector, the method comprising the steps of:

receiving radiation pulses from a radiation source at a detector over a calibration period, the received radiation pulses per unit time defining the input count rate during the calibration period;

measuring a detector signal over the calibration period from the detector comprising an aggregation of individual signal pulses from each received radiation pulse;

in a calibration mode:

calculating a parameter derived from the detector signal sampled over the calibration period, the parameter being a known function of the input count rate;

estimating a calibration input count rate during the calibration period using a chosen input count rate estimation method applied to the detector signal sampled over the calibration period known to be reliable at the estimated calibration input count rate; and determining a calibration function relating measurements of the parameter to the input count rate based on the calculated parameter over the calibration period, the calibration input count rate during the calibration period and the known function; and in an operation mode:

calculating the parameter derived from the detector signal over a measurement period; and estimating the input count rate during the measurement period by applying the calibration function to the parameter derived from the detector signal over the measurement period.

8. The method of claim 7, wherein the known function of the input count rate is proportionality and the calibration function and the step of determining the calibration function comprises determining a proportionality constant.

9. The method of claim 8, wherein the parameter is based on an average sample value of the detector signal over the calibration or measurement period.

10. The method of claim 7, wherein the chosen input count rate estimation method comprises the steps of:

receiving radiation pulses from a radiation source at a detector, the received radiation pulses per unit time defining the input count rate;

receiving a detector signal from the detector comprising an aggregation of individual signal pulses from each received radiation pulse;

using a detection method, detecting individual signal pulses in the detector signal and determining corresponding detected individual signal pulse arrival times;

defining a plurality of interval start times each neighbouring pair of which being interposed with at least one of the detected individual signal pulse arrival times, each interval start time occurring later than a corresponding most recent detected individual signal pulse arrival time by a specified detection gap being at least as large as a minimum reliable detection gap of the detection method, thereby ensuring that there are no undetected individual signal pulses occurring between each of the interval start times and a corresponding next detected individual signal pulse arrival time;

calculating a corresponding plurality of individual signal pulse arrival intervals between each of the interval start times and the corresponding next detected individual signal pulse arrival time; and computing an input count rate parameter, based on the individual signal pulse arrival intervals.

11. The method of estimating input count rate in a radiation pulse detector of claim 1, wherein the radiation pulse detector detects one or more of: quantum mechanical particles including photons, subatomic particles, ions, or atoms; classical pulses in seismic waves, SONAR, SODAR, radar or LiDAR.

12. A method of any one or more of security scanning, baggage scanning, medical imaging, materials analysis, meteorological sensing, minerals processing, security scanning, mineral processing, minerals analysis, reflection seismology, or DNA sequencing, including the step of estimating input count rate in a radiation pulse detector according to claim 1.

13. An apparatus including a radiation pulse detector implementing the method of claim 1.

14. The method of estimating input count rate in a radiation pulse detector of claim 7, wherein the radiation pulse detector detects one or more of: quantum mechanical particles including photons, subatomic particles, ions, or atoms; classical pulses in seismic waves, SONAR, SODAR, radar or LiDAR.

15. A method of any one or more of security scanning, baggage scanning, medical imaging, materials analysis, meteorological sensing, minerals processing, security scanning, mineral processing, minerals analysis, reflection seismology, or DNA sequencing, including the step of estimating input count rate in a radiation pulse detector according to claim 7.

16. An apparatus including a radiation pulse detector implementing the method of claim 7.

* * * * *